M. PHILLIPS & W. P. LYTLE.
SLEIGH RUNNER ATTACHMENT FOR WAGONS.
APPLICATION FILED APR. 8, 1912.
1,045,739.
Patented Nov. 26, 1912.
2 SHEETS—SHEET 1.
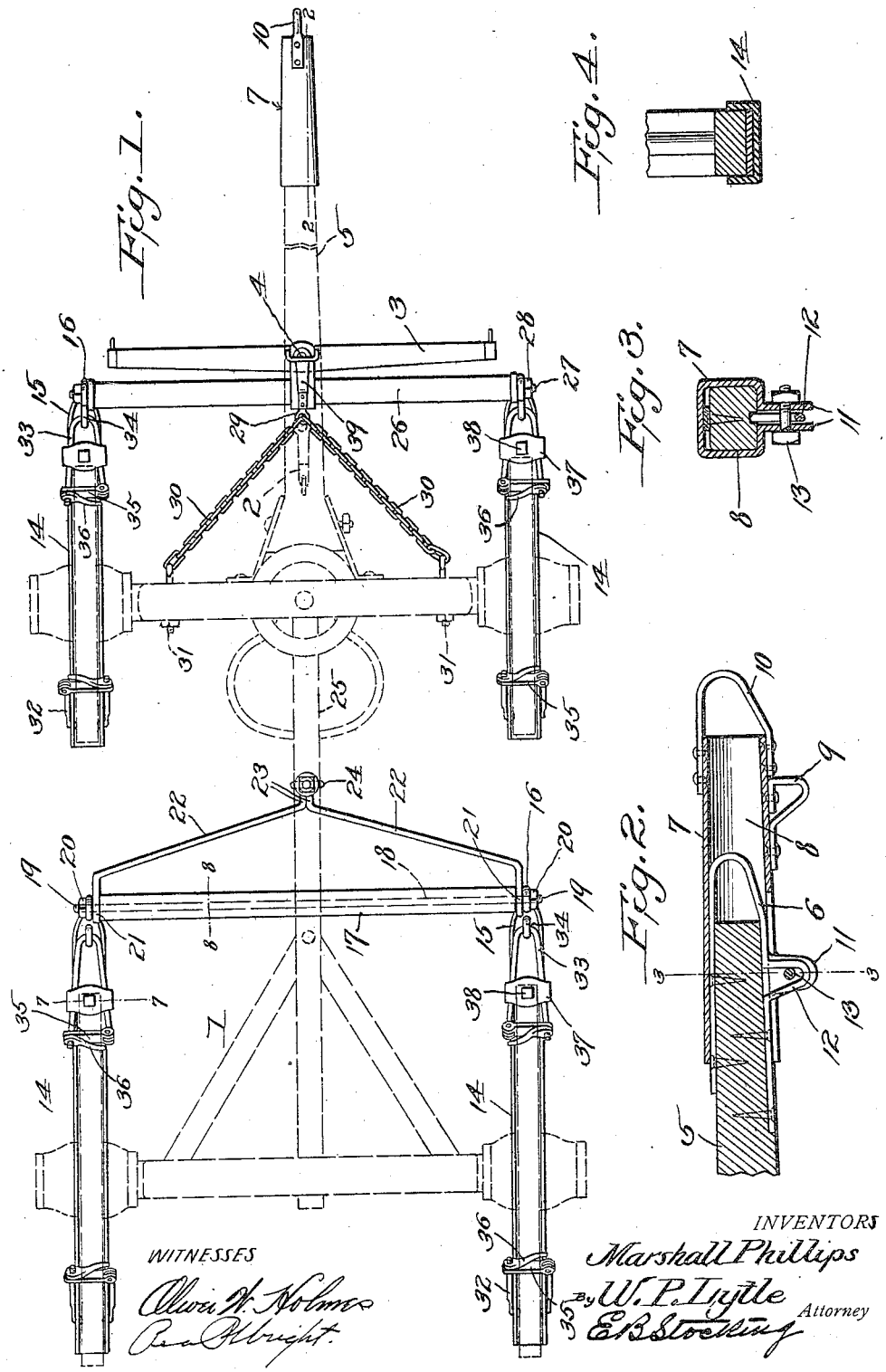
INVENTORS
Marshall Phillips
W. P. Lytle
E. B. Stocking
Attorney
WITNESSES M. PHILLIPS & W. P. LYTLE.
SLEIGH RUNNER ATTACHMENT FOR WAGONS.
APPLICATION FILED APR. 8, 1912.
1,045,739.
Patented Nov. 26, 1912.
2 SHEETS—SHEET 2.
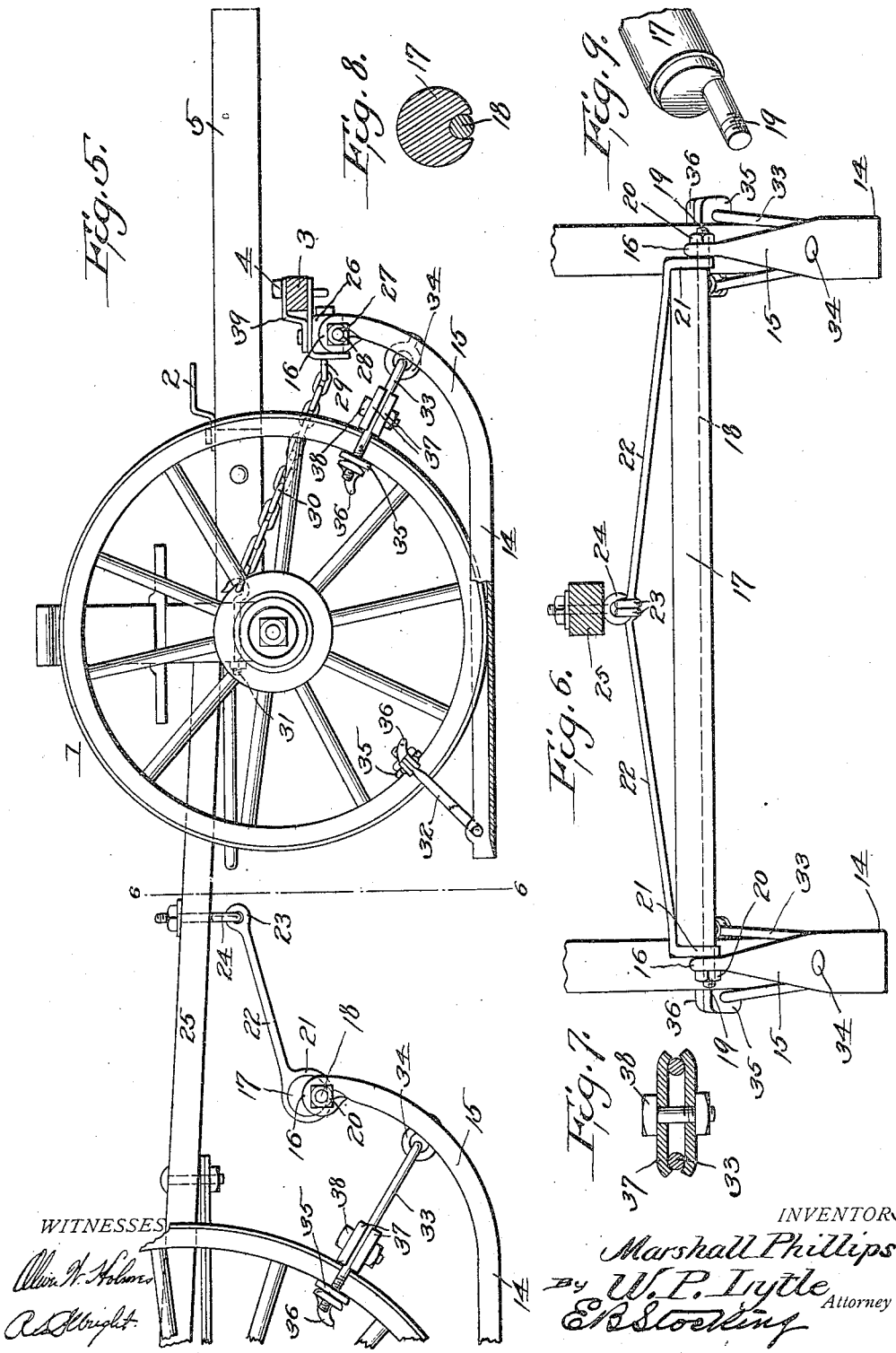
INVENTORS
Marshall Phillips
By W. P. Lytle
Attorney

UNITED STATES PATENT OFFICE.

MARSHALL PHILLIPS AND WILLIAM P. LYTLE, OF CROFTON, NEBRASKA.

SLEIGH-RUNNER ATTACHMENT FOR WAGONS.

1,045,739.  Specification of Letters Patent.  Patented Nov. 26, 1912.

Application filed April 8, 1912. Serial No. 689,193.

*To all whom it may concern:*

Be it known that we, MARSHALL PHILLIPS and WILLIAM P. LYTLE, citizens of the United States, residing at Crofton, county of Knox, State of Nebraska, have invented certain new and useful Improvements in Sleigh-Runner Attachments for Wagons, of which the following is a specification, reference being had therein to the accompanying drawing.

This invention relates to certain new and useful improvements in sleigh runner attachments for wagons and vehicles of all kinds, the object being to provide a set of runners which are so constructed that the wagons can be readily driven upon the same and the runners securely fastened to the wheels of the wagons so as to convert the wagon into a bob sleigh.

Another object of the invention is to provide novel means for connecting the draft animals to the sleigh thus formed whereby the double-tree of the wagon can be transferred to the runners, an extensible tip being provided for the pole so as to compensate for the shifting of the coupling of the swingle-tree.

A further object of the invention is to provide a set of runners which are formed in pairs connected together at their forward ends by cross-bars to which are secured the connecting members fastening the same to the running gear of the wagon.

A still further object of the invention is to provide the runners with pivoted links carrying clamping members for securing the runners to the wheel, the forward links of each runner being provided with clips in order to strengthen the links to form braces in order to hold the runners rigidly so as to prevent the same buckling at their forward ends by coming into contact with obstructions in the road-bed.

Other and further objects and advantages of the invention will be hereinafter set forth and the novel features thereof defined by the appended claims.

In the drawings—Figure 1 is a top plan view of our improved sleigh runner attachment showing the application of the same to a wagon, the wagon being shown in dotted lines; Fig. 2 is a detail longitudinal section through the end of the pole showing our improved extensible tip arranged in position thereon; Fig. 3 is a section taken on line 3—3 of Fig. 2 showing the manner of fastening the tip in extended position; Fig. 4 is a detail transverse section taken through the runner showing the wheel in position therein; Fig. 5 is a side elevation of the wagon showing our improved sleigh runner attachment applied thereto, the wagon being partly broken away and one runner partly in section; Fig. 6 is a section taken on line 6—6 of Fig. 5; Fig. 7 is an enlarged section taken on line 7—7 of Fig. 1; Fig. 8 is an enlarged section taken on line 8—8 of Fig. 1; and Fig. 9 is a detail perspective view of one of the cross-bars used for connecting the mating runners.

Like numerals of reference refer to like parts in the several figures of the drawings.

In the drawings, 1 indicates a wagon of the ordinary construction which is provided with the usual double-tree coupling 2 adapted to receive the double-tree 3 which is secured therein by the usual pin 4. The pole 5 of the wagon is provided with the usual form of tip 6 for connecting the neck yokes and mounted upon said tip is an extensible tip 7 comprising a tubular portion 8 having the usual eyes 9 and 10 for connecting the neck yokes thereto. The tubular portion 8 of the extensible tip is provided with depending spaced lugs 11 having transverse apertures adapted to register with the eye 12 of the tip 6 and through which a bolt 13 is adapted to pass for locking the tip 6 in extended position. By this construction, the tip can be forced rearwardly and secured over the tip 6 by the bolt 13 when the eyes 9 and 12 are brought into register. The advantage of providing the wagon with an extensible tip will be hereinafter fully set forth.

The sleigh runner attachment comprises a set of runners arranged in pairs, each runner being preferably formed of a channel bar 14 having a curved forward portion 15 terminating in a reduced portion which is bent to form an eye 16. The rear portions of the runners are constructed to rest flat upon the ground in order that the wagon can be readily driven upon the runners. The mating runners of the rear pair are connected together by a cross-bar 17 which may be of any desired construction but is herein shown provided with a metal core 18 having threaded end portions 19 on which the eyes 16 of the runners are pivotally mounted and secured by nuts 20. By connecting the runners in this manner, each runner is allowed to move independently and are properly spaced at their forward ends in order to prevent the same from twisting when traveling over rough roads. The cross-bars 17 are reduced adjacent their ends on which are pivotally mounted the eyes 21 of rods 22 which extend toward each other and are provided with eyes 23 at their free ends loosely mounted in an eye-bolt 24 secured in the reach 25 of the wagon. By this construction, the runners are connected to the wagon so that all danger of the runners moving rearwardly is prevented. The forward mating runners are connected together by a cross-bar 26 constructed in substantially the same manner as the cross-bar 17 having the core 27, the protruding ends of which extend through the eyes of the forward runners and are provided with nuts 28 for securing the same in position thereon. The forward cross-bar 26 is provided with a central eye 29 in which are mounted chains 30 which diverge and are secured at their free ends to eye bolts 31 carried by the axle of the wagon.

For securing the runners firmly in position upon the wheels so as to prevent the wheels moving in either direction thereon, we provide each runner with links 32 and 33, the rear links 32 being pivotally mounted in apertures formed in the flanges of the channel bar and the forward links 33 being pivotally mounted in an eye bolt 34 carried by the curved portion of the runner. The ends of the links 32 and 33 carry clamping members adapted to engage the fellies of the wheels and comprise pivoted clamping plates 35 carried by one of the arms of the links having free apertured ends which are adapted to receive the threaded ends of the other arms of the links and on which are mounted lever nuts 36 for clamping the plates firmly over the wheels. The forward links 33 are provided with clips 37 comprising spaced plates adapted to embrace the arms of the links and through which a clamping bolt 38 passes for securing the clips in their adjusted position upon the links and as shown, the clips are adapted to engage the tires of the wheels in order to form braces so as to prevent the curved portions of the runners from buckling or yielding when brought into engagement with an obstruction. By this manner of connecting the runners to the wheels, it can be easily and quickly connected or detached therefrom in order to convert the wagon into a bob sleigh or back into a wagon therefrom.

In order to provide means for connecting the draft animals to the runners, we provide the forward cross-bar 26 with a coupling member 39 adapted to receive the doubletree 3 of the wagon and be secured in position therein by the coupling pin 4 and it will be seen that when the double-tree is shifted from the wagon to the sleigh runners, the same will be thrown forward and in order to compensate for this we provide the extensible tip 7 whereby the animals, when harnessed and connected to the swingle-trees, not shown, will be properly coupled.

From the foregoing description, it will be seen that we have provided a sleigh runner attachment for wagons in which means is provided for connecting the draft animals directly to the runners in order to relieve the strain of the connecting members when a heavy load is being drawn. It will also be seen that the rear runners are connected to the wagon in such a manner that the strain upon the wheel clamping means is greatly reduced.

What we claim is—

1. A sleigh runner attachment for wagons comprising mating runners for the front and rear wheels thereof, cross-bars connecting the forward ends of the mating runners and pivotally mounted therein, a connection between one of said cross-bars and said wagon, and a double-tree coupling carried by the other cross-bar.

2. A sleigh runner attachment for wagons comprising mating runners for the front and rear wheels thereof, means for securing said runners to said wheels, cross-bars connecting the front ends of said runners and pivotally mounted therein, a connection between the cross-bar of the rear runners and said wagon, and a double-tree coupling carried by the cross-bar of the front runners.

3. A sleigh runner attachment for wagons comprising mating runners for the front and rear wheels thereof, said runners terminating in eyes at their forward ends, cross-bars provided with cores having outwardly projecting threaded ends pivotally mounted in the eyes of said runners, nuts for securing said cores therein, said cross-bars being provided with reduced end portions, rods provided with eyes pivotally mounted on the reduced ends of the rear cross-bar, said rods being loosely connected to a link carried by the reach of the wagon to which the runners are attached, and means carried by the runners for securing the wheels in position thereon.

4. A sleigh runner attachment for wagons comprising a pair of mating runners having outwardly curved front end portions terminating in eyes, a cross-bar connecting said runners having projections extending through said eyes and pivotally mounted therein, means for fastening said projections in said eyes, said cross-bars being provided with reduced end portions, rods having eyes pivotally mounted upon the reduced portions of said cross bar, said rods having a loose connection with the reach of the wagon.

5. A sleigh runner attachment for wagons comprising a set of runners, each one of which is adapted to receive a wheel of the wagon, cross-bars pivotally connecting the forward ends of the mating runners, means for clamping the wheels in position upon said runners, a double-tree coupling carried by the cross-bar connecting the forward mating runners, and rods pivotally mounted upon the reach of the wagon connecting the cross-bar of the rear mating runners.

6. A sleigh runner attachment for wagons comprising a set of runners, each runner being provided with an eye at its forward end, a cross-bar for each pair of mating runners pivotally mounted in the eyes of said runners and secured therein, rods pivotally mounted upon the rear cross-bar of the mating runners connected to the reach of the wagon to which the runners are attached, and a connection from the front cross-bar to the running gear of the wagon.

7. A sleigh runner attachment for wagons comprising mating connected runners capable of receiving wheels at their rear end portions, links carried by said runners adjacent each end provided with clamping means for engaging the wheels of the wagon, clips connecting the arms of said links carried by the forward ends of the runners, and means carried by the connecting members of said mating runners for connecting the runners to the running gear of a wagon.

8. A sleigh runner attachment for wagons comprising a pair of grooved runners having curved forward ends terminating in eyes, a cross-bar provided with a core pivotally mounted within the eyes of said runners, means for securing the core within said eyes for preventing outward movement, said cross-bar preventing inward movement, and a connection from said cross-bar to the running gear of the wagon.

9. The combination with a wagon, of mating runners adapted to receive the rear wheels of the wagon, a bar connecting the forward end of said runners having a pivotal connection therewith, means for securing said runners upon the wheels of said wagon, and rods pivotally mounted upon said cross-bars having their free ends loosely connected to an eye bolt carried by the reach of the wagon.

10. A sleigh runner attachment for wagons comprising a set of runners arranged in pairs and connected together at their forward ends by cross-bars pivotally mounted therein, links carried by said runners provided with clamping means for engaging the wheels of the wagon, and clips mounted upon the forward link of each runner adapted to engage the wheel of the wagon.

11. A sleigh runner attachment for wagons comprising mating runners terminating at their forward ends in eyes, cross-bars pivotally mounted in said eyes, means for connecting said cross-bars to a wagon, means for connecting said runners to the wheels of a wagon, and a draft connection carried by the cross-bar of the forward mating runners.

In testimony whereof we affix our signatures in presence of two witnesses.

MARSHALL PHILLIPS.
WILLIAM P. LYTLE.

Witnesses:
N. CURTIS LAMMOND,
REA P. WRIGHT.

---

Copies of this patent may be obtained for five cents each, by addressing the "Commissioner of Patents, Washington, D. C."